Figure 1:
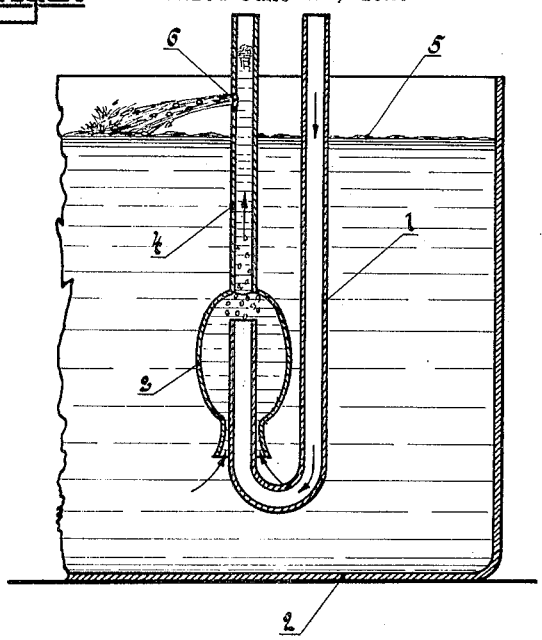

March 2, 1926. 1,574,783
E. W. BETH
PROCESS AND DEVICE FOR REGENERATING WATER OF AQUARIA
Filed June 23, 1925

Inventor
Evert Willem Beth
By B. Singer, Atty.

Patented Mar. 2, 1926.

1,574,783

UNITED STATES PATENT OFFICE.

EVERT WILLEM BETH, OF THE HAGUE, NETHERLANDS.

PROCESS AND DEVICE FOR REGENERATING WATER OF AQUARIA.

Application filed June 23, 1925. Serial No. 39,144.

*To all whom it may concern:*

Be it known that I, EVERT WILLEM BETH, a citizen of the Kingdom of the Netherlands, residing at The Hague, the Netherlands, Nieuwe Uitleg 31, have invented certain new and useful Improvements in Processes and Devices for Regenerating Water of Aquaria, of which the following is a full, clear, and exact specification.

The present invention has reference to a process and a device for regenerating water of aquaria, whereby the water of an aquarium is conveyed by means of compressed air, together with said air through a tube open at both ends above the water level and is then allowed to flow back in the aquarium.

I am aware that in a process of this kind, the exhaust end of the tube in which the water is regenerated, is bent downwards and as a consequence the vitiated air with the carbonic acid and other gases are spouted back in the aquarium. In this way the greater part of the noxious gases are conveyed back into the water.

According to the invention, the vitiated air, mixed with the carbonic acid and other gases on the one hand and the regenerated water on the other hand are conveyed along separate ways.

In this manner the noxious gases, and eventually an excess of oxygen absorbed by the air in the tube open at both ends escape at the top of said tube, which acts in the way of a chimney. On the other hand the water deprived of its gases is allowed to fill up its grade of oxygen by means of atmospherical oxygen, on account of its being spouted through the air from an opening of the tube, situated above the water level in the form of a long jet. This long and powerful jet is due to the action of a column of water formed in the degassing tube above the exhaust opening of this tube. The powerful jet presents another advantage viz, that of keeping the surface in a state of turbulency, thus promoting the circulation and the assimilation of oxygen. Another important feature of the invention is that the use of a filter—no matter at which part of the device it is placed—is carefully avoided, because the infusorians, indispensable for the life of the fishes, are kept back therein.

The device according to the invention consists of two tubes, one of which, the degassing tube, is open at both ends and is provided with an orifice for the pumped up water, situated at a distance under its top end, whilst the exhaust opening of the other tube, which conveys the compressed air, is situated into and near the lower end of said degassing tube.

The tube for the compressed air may, according to the preferred embodiment of the invention, be placed within the degassing tube.

The following description, with reference to the accompanying drawings, of apparatus in accordance with my invention, will explain how it can be carried into effect, but I do not limit myself to the particular arrangements hereinafter described.

Fig. 1 shows a vertical section of a first embodiment and

Figure 2:
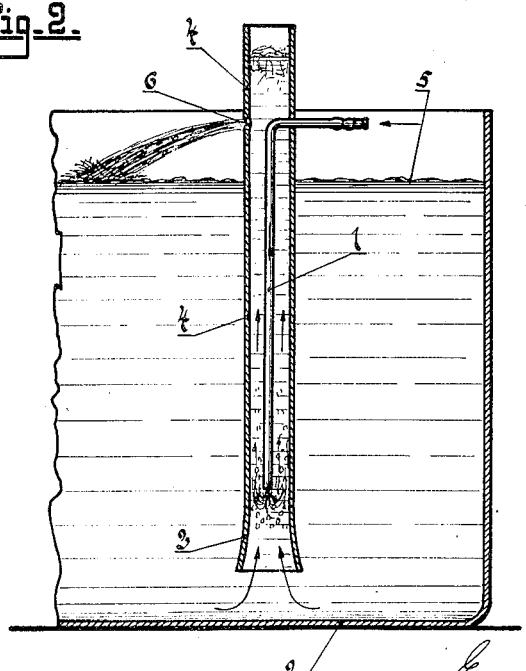

Fig. 2 a vertical section of the perferred embodiment of the invention.

1 is the tube for admitting the compressed air, which should be at a pressure of about 2 atm. The exhaust opening of this tube ends in the lower part 3 of a second tube 4, reaching from a short distance of the bottom 2 of the aquarium till above the water-level 5. The tube 4 is provided with an exhaust opening 6 situated between the water-level and the top of the tube.

The last mentioned tube may, according to the first embodiment, be lowered or raised in order to be applicable to aquaria of different depths.

When air is admitted in the tube 1, an ejector action takes place in the lowermost part 3 of the degassing tube and water is drawn out of the aquarium and conveyed by and with the air in the tube 4 till beyond the opening 6. Combustion takes place in the tube 4, where carbonic acid is formed at the expense of the oxygen of the air. As a consequence of the column of water formed above the opening 6, the regenerated water is expelled with force through the said opening, whilst the excess of air and the noxious gases escape in vertical direction, thereby breaking their way through the column of water situated above the opening 6. This is the cause of the continual up and down movements of said water column during the working of the device. The regenerated water ejected back into the aquarium and through the air has ample opportunity to fill up its grade of oxygen. Moreover the drawing of water at the bottom 3 of the tube 4 creates a uniform circulation.

The preferred embodiment shown in Fig.

2 is even more simple of construction on account of the air tube 1 being adapted in the inside of the tube 4 and provided with a mouthpiece extending outside the surrounding tube, as illustrated. At the underside, the air tube ends at a convenient distance from the lower extremity of the degassing tube 4.

The invention presents the advantage that the composition of the water remains unchanged (excepting of course its growing richer in oxygen and poorer in nitrogen) and that the infusorians are not kept back nor killed as is the case by known devices, but thrive in their natural state thus providing plenty of food for the microscopic creatures. The result of the process is that plants as well as the creatures remain perfectly healthy and grow and thrive in the same way as in their natural state when kept in water treated according to the invention.

I claim:

1. A process for regenerating water of aquaria, whereby the water of the aquarium is conveyed by means of compressed air above the waterlevel and is then allowed to flow back in the aquarium, characterized by the fact that the vitiated air with the carbonic acid and other gases on the one hand and the regenerated water on the other hand are expelled along separate ways, said regenerated water being spouted in the shape of a long and powerful jet through the air, without interposition of any other device, direct in the water of the aquarium.

2. Device for applying the process described in claim 1, consisting of two tubes, one of which (4), the degassing tube is open at both ends and is provided with an exhaust orifice (6) for the pumped up water, situated at a distance under its top end, whilst the exhaust opening of the other tube (1), which conveys the compressed air, is situated into and near the lower end of said degassing tube (4).

3. Apparatus for applying the process described in claim 1, comprising a degassing tube open at both ends and provided with an exhaust orifice for the pumped up water, located at a distance under its upper end, and a tube for compressed air arranged within the degassing tube and having an exhaust opening at its lower end and near the lower end of said degassing tube.

EVERT WILLEM BETH.